United States Patent
Lee et al.

(10) Patent No.: US 8,982,718 B2
(45) Date of Patent: Mar. 17, 2015

(54) APPARATUS AND METHOD FOR TRANSMITTING AND RECEIVING SOUNDING SIGNAL IN A WIRELESS COMMUNICATION SYSTEM

(75) Inventors: Yong-Hwan Lee, Seoul (KR); Hyung-Sin Kim, Seoul (KR); Seung-Hwan Lee, Anyang-si (KR)

(73) Assignees: Samsung Electronics Co., Ltd., Suwon-Si (KR); Seoul National University R&DB Foundation, Seoul (KR)

( * ) Notice: Subject to any disclaimer, the term of this patent is extended or adjusted under 35 U.S.C. 154(b) by 525 days.

(21) Appl. No.: 13/020,906

(22) Filed: Feb. 4, 2011

(65) Prior Publication Data
US 2011/0194509 A1  Aug. 11, 2011

(30) Foreign Application Priority Data
Feb. 5, 2010  (KR) .................. 10-2010-0011210

(51) Int. Cl.
*G08C 15/00*  (2006.01)
*H04L 12/28*  (2006.01)
*H04L 5/00*  (2006.01)
*H04B 7/02*  (2006.01)

(52) U.S. Cl.
CPC ............ *H04L 5/0048* (2013.01); *H04L 5/0007* (2013.01); *H04L 5/0023* (2013.01); *H04L 5/0035* (2013.01); *H04L 5/0073* (2013.01); *H04B 7/024* (2013.01)
USPC .......................................... 370/252; 370/431

(58) Field of Classification Search
None
See application file for complete search history.

(56) References Cited

U.S. PATENT DOCUMENTS

| | | | |
|---|---|---|---|
| 2008/0273479 A1* | 11/2008 | Kwak et al. ................... | 370/311 |
| 2010/0002676 A1* | 1/2010 | Doi et al. ....................... | 370/345 |
| 2010/0009707 A1* | 1/2010 | Porat ............................. | 455/517 |
| 2010/0214993 A1* | 8/2010 | Malkov et al. ................ | 370/329 |
| 2011/0014909 A1* | 1/2011 | Han et al. ....................... | 455/423 |
| 2011/0261806 A1* | 10/2011 | Chun et al. .................... | 370/342 |
| 2012/0252474 A1* | 10/2012 | Tiirola et al. .................. | 455/450 |

OTHER PUBLICATIONS

K. Wu, et al.: "Distributed Sounding Allocation for Multi-Cell MIMO", ieee c80216M-08/724r1, Jul. 7, 2008, 7 pages.
Draft Amendment for IEE Standard for Local and Metropolitan Area Networks, IEEE P802.16m/1, "Part 16: Air Interface for Broadband Wireless Access Systems", Jul. 2009, 513 pages.

* cited by examiner

*Primary Examiner* — Ashley Shivers

(57) ABSTRACT

In a wireless communication system, at least one sounding subchannel determining parameter is transmitted from a sounding signal receiving apparatus to a sounding signal transmitting apparatus. A sounding subchannel for the sounding signal transmitting apparatus is allocated according to the sounding subchannel determining parameter. A sounding signal is received from the sounding signal transmitting apparatus over the allocated sounding subchannel. The sounding subchannel determining parameter is determined for allocating a sounding subchannel considering a frequency correlation.

24 Claims, 5 Drawing Sheets

APPARATUS AND METHOD FOR TRANSMITTING AND RECEIVING SOUNDING SIGNAL IN A WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Feb. 5, 2010 and assigned Serial No. 10-2010-0011210, the entire disclosure of which is hereby incorporated by reference.

TECHNICAL FIELD OF THE INVENTION

The present invention relates to an apparatus and method for transmitting and receiving a sounding signal in a wireless communication system.

BACKGROUND OF THE INVENTION

A wireless communication system generally uses a multi-sector approach, and performance of a Mobile Station (MS) located in a sector boundary region significantly deteriorates due to Inter-Sector Interference (ISI). Therefore, it is necessary to reduce ISI in order to improve the overall system performance of the wireless communication system.

Meanwhile, if it is possible to detect channel information of MSs, a Base Station (BS) can significantly reduce ISI by using multi-sector cooperative beam forming. Therefore, various schemes for detecting channel information of MSs have been proposed, such as a scheme of detecting channel information using a sounding signal. The scheme of detecting channel information of MSs using the sounding signal is described below.

In a wireless communication system using Time Division Duplex (TDD) Orthogonal Frequency Division Multiplexing (OFDM), because an uplink and a downlink are identical to each other in channel characteristics, when an MS transmits a sounding signal to a BS over the uplink, the BS may detect channel information of the MS using the sounding signal. For convenience of description, the wireless communication system using TDD OFDM will be referred to as a TDD OFDM wireless communication system, and one example of the TDD OFDM wireless communication system is an Institute of Electrical and Electronics Engineers (IEEE) 802.16m communication system.

However, if the MS is located in a sector boundary region, a sounding signal transmitted by the MS may interfere with a sounding signal transmitted by another MS that is in a neighbor sector, causing significant distortion.

Therefore, in the IEEE 802.16m communication system, a sounding resource reuse scheme has been proposed to reduce ISI by allowing sectors to use different sounding resources. However, because use of the sounding resource reuse scheme leads to a decrease in available sounding resources per sector, the number of MSs capable of transmitting a sounding signal without ISI while using the same sounding subchannel decreases in inverse proportion to the number of sectors. Thus, compared with an independent sounding resource distribution scheme in which all sectors use the same sounding resources, the sounding resource reuse scheme disadvantageously suffers from a decrease in Multi User Diversity (MUD) gain by opportunistic scheduling.

To overcome the shortcomings of the sounding resource reuse scheme, a multi-symbol sounding resource reuse scheme has been proposed in the IEEE 802.16m communication system. The multi-symbol sounding resource reuse scheme allows a plurality of MSs to simultaneously transmit sounding signals, by using not only Frequency Division Multiplexing (FDM) and Code Division Multiplexing (CDM) but also Time Division Multiplexing (TDM). Therefore, in the multi-symbol sounding resource reuse scheme, the same number of MSs as that in the independent sounding resource distribution scheme can transmit sounding signals without ISI.

However, the multi-symbol sounding resource reuse scheme increases in ratio of sounding resources to the total available uplink resources and thus decreases in uplink resources for data transmission, causing a reduction in data transmission efficiency.

In addition, disadvantageously, both the multi-symbol sounding resource reuse scheme and the independent sounding resource distribution scheme are inefficiently high in terms of sounding signal transmission overhead of each MS because neither scheme of allocating sounding resources considers channel information of MSs.

Therefore, there is a need for a sounding signal transmission/reception method capable of minimizing ISI while minimizing the sounding resources used.

SUMMARY OF THE INVENTION

To address the above-discussed deficiencies of the prior art, it is a primary object to provide at least the advantages described below. Accordingly, an aspect of the embodiments of the present invention is to provide an apparatus and method for transmitting and receiving a sounding signal in a wireless communication system.

Another aspect of the embodiments of the present invention is to provide an apparatus and method for transmitting and receiving a sounding signal using channel information of an MS in a wireless communication system.

In accordance with one aspect of the present invention, there is provided a sounding signal receiving apparatus in a wireless communication system. The apparatus includes a transmitter for transmitting at least one sounding subchannel determining parameter to a sounding signal transmitting apparatus. A controller determines a sounding subchannel for the sounding signal transmitting apparatus according to the sounding subchannel determining parameter. A sounding subchannel allocator allocates a sounding subchannel for the sounding signal transmitting apparatus under control of the controller. And a receiver receives a sounding signal from the sounding signal transmitting apparatus over the allocated sounding subchannel. The sounding subchannel determining parameter may be determined for allocating a sounding subchannel considering a frequency correlation.

In accordance with another aspect of the present invention, there is provided a sounding signal transmitting apparatus in a wireless communication system. The apparatus includes a receiver for receiving at least one sounding subchannel determining parameter from a sounding signal receiving apparatus. A controller determines a sounding subchannel according to the sounding subchannel determining parameter. A sounding subchannel allocator allocates the sounding subchannel under control of the controller. And a transmitter for transmits a sounding signal to the sounding signal receiving apparatus over the allocated sounding subchannel. The sounding subchannel determining parameter may be determined for allocating a sounding subchannel considering a frequency correlation.

In accordance with further another aspect of the present invention, a method is provided for receiving a sounding signal by a sounding signal receiving apparatus in a wireless communication system. The method includes transmitting at least one sounding subchannel determining parameter to a sounding signal transmitting apparatus. A sounding subchannel is allocated for the sounding signal transmitting apparatus according to the sounding subchannel determining parameter. And a sounding signal is received from the sounding signal transmitting apparatus over the allocated sounding subchannel. The sounding subchannel determining parameter may be determined for allocating a sounding subchannel considering a frequency correlation.

In accordance with yet another aspect of the present invention, a method is provided for transmitting a sounding signal by a sounding signal transmitting apparatus in a wireless communication system. The method includes receiving at least one sounding subchannel determining parameter from a sounding signal receiving apparatus. A sounding subchannel is allocated according to the sounding subchannel determining parameter. And a sounding signal is transmitted to the sounding signal receiving apparatus over the allocated sounding subchannel. The sounding subchannel determining parameter may be determined for allocating a sounding subchannel considering a frequency correlation.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides an apparatus and method for transmitting and receiving a sounding signal in a wireless communication system. While the present invention will be described with reference to a Time Division Duplex (TDD) Orthogonal Frequency Division Multiplexing (OFDM) communication system as an example of the wireless communication system, the sounding signal transmission/reception apparatus and method of the present disclosure may also be used in other communication systems. For convenience of description, it is assumed herein that a Mobile Station (MS) is an example of an apparatus for transmitting a sounding signal, and a Base Station (BS) is an example of an apparatus for receiving a sounding signal. Therefore, the sounding signal transmitting apparatus may include not only the MS but also other apparatuses, and the sounding signal receiving apparatus may also include not only the BS but also other apparatuses.

Figure 1:
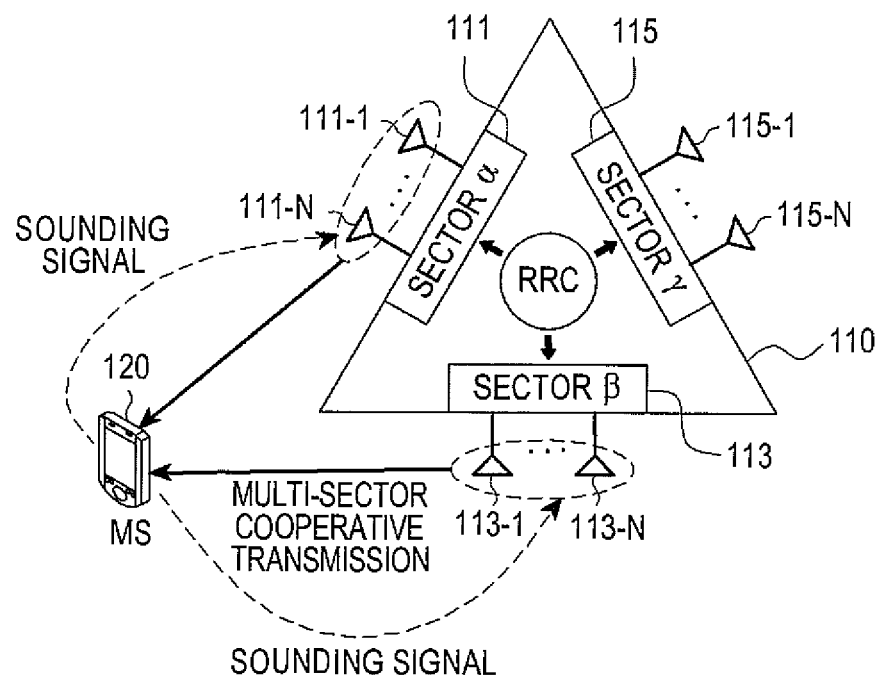
FIG. 1 schematically illustrates a configuration of a TDD OFDM communication system according to an embodiment of the present invention.

FIG. 1 schematically illustrates a configuration of a TDD OFDM communication system according to an embodiment of the present invention.

Referring to FIG. 1, the TDD OFDM communication system includes a BS 110 and an MS 120. The BS 110 includes a plurality of sectors. For example, BS 110 includes three sectors: a sector α 111, a sector β 113, and a sector γ 115, each of which uses N antennas. That is, the sector α 111 uses an antenna #1 111-1 to an antenna #N 111-N, the sector β 113 uses an antenna #1 113-1 to an antenna #N 113-N, and the sector γ 115 uses an antenna #1 115-1 to an antenna #N 115-N. It is assumed that the MS 120 uses one or more antennas. The MS 120 receives at least one sounding subchannel determining parameters used to determine a sounding subchannel and a sounding subcarrier for carrying a sounding signal, from the sector a 111 or a serving sector, and determines a sounding subchannel and a sounding subcarrier using the received sounding subchannel determining parameter. The sounding subchannel determining parameter will be described in detail below.

If the MS 120 transmits a sounding signal using the determined sounding subchannel and sounding subcarrier, the sector α 111 (or the serving sector) and the sector β 113 (or a neighbor sector) receive the sounding signal transmitted by the MS 120.

While only one MS 120 is shown in FIG. 1, K sector boundary region MSs may exist in coverage of the BS 110. The sector boundary region MS represents an MS located in a sector boundary region. While sectors transmit signals using a multi-sector cooperative approach by way of example in FIG. 1, each sector may transmit a signal independently.

It addition, it is assumed that the number of subchannels used as sounding subchannels in the TDD OFDM communication system is M, and each of the M sounding subchannels includes F sounding subcarriers. In this situation, an (N×1) sounding signal vector $Y_s(f)$ that a sector s has received using a sounding subcarrier f can be represented by Equation 1 below, in which s represents a sector index, f represents a sounding subcarrier index, and N represents the number of antennas used by a sectors.

$$Y_s(f) = \sum_{k=0}^{K-1} H_{s,k}(f) P_k(f) + N(f) \qquad \text{[Eqn. 1]}$$

where $P_k(f)$ represents a sounding signal transmitted by an MS k using a subcarrier f, N(f) represents an (N×1) vector indicative of a Gaussian noise component, and $H_{s,k}(f)$ represents an (N×1) channel vector for a subcarrier f between a sector s and an MS k. Here, k represents an MS index.

In addition, $H_{s,k}(f)$ in Equation 1 can be expressed as Equation 2 below.

$$H_{s,k}(f) = \begin{bmatrix} H_{s,k}(f, 1) \\ \vdots \\ H_{s,k}(f, N) \end{bmatrix} \qquad \text{[Eqn. 2]}$$

Where $H_{s,k}(f, n)$ represents a channel gain between an antenna n of a sector s and an MS k in a sounding subcarrier f. Here, n represents an antenna index, and $H_{s,k}(f, n)$ in Equation 2 can be expressed as Equation 3 below.

$$H_{s,k}(f,n) = \alpha_{s,k} h_{s,k}(f,n) \qquad \text{[Eqn. 3]}$$

where $\alpha_{s,k}(0 \leq \alpha_{s,k} \leq 1)$ represents a pass loss of a channel between a sector s and an MS k, and $H_{s,k}(f, n)$ represents an independent and identically distributed (i.i.d.) complex Gaussian random variable with an average of '0' and a variance of '1'.

Meanwhile, assuming that a BS including S sectors transmits a signal in a multi-sector cooperative approach using antennas of two sectors (a sector s and a sector s') neighboring a sector boundary region MS, a (2N×1) channel vector between an MS k and sectors s and s' in a sounding subcarrier f can be represented by Equation 4 below.

$$H_k(f) = \begin{bmatrix} H_{s,k}(f) \\ H_{s',k}(f) \end{bmatrix} \qquad \text{[Eqn. 4]}$$

Meanwhile, the BS may estimate the channel vector $H_k(f)$ using a received sounding signal $Y_s(E)$, and in this situation, a channel estimation Mean Squared Error (MSE) for an MS k is assumed to be $\sigma_k^2$. In a sector boundary region, because an MS k is located at a substantially equal distance from the sectors s and s', it can be assumed that $\alpha_{s,k} \approx \alpha_{s',k} = \alpha_k$. In this situation, a (2N+1) channel estimation vector $\tilde{H}H_k(f)$ between an MS k and sectors s and s' in a subcarrier f can be represented by Equation 5 below.

$$\tilde{H}_k(f) = H_k(f) + \sigma_k Z_k(f) \qquad \text{[Eqn. 5]}$$

where $Z_k(f)$ represents an (2N×1) i.i.d. complex Gaussian random vector with an average of '0' and a variance of '1', and the channel vector $H_k(f)$ in Equation 5 can be expressed as Equation 6 below.

$$H_k(f) = \frac{\alpha_k^2}{\alpha_k^2 + \sigma_k^2} \tilde{H}_k(f) + \frac{\alpha_k \sigma_k}{\sqrt{\alpha_k^2 + \sigma_k^2}} Z_k(f) \qquad \text{[Eqn. 6]}$$

In addition, a frequency correlation $R_{s,k}(\Delta f, n)$ between a channel $h_{s,k}(f-\Delta f, n)$ and a channel $h_{s,k}(f, n)$ can be represented by Equation 7 below.

$$R_{s,k}(\Delta f, n) = E[h_{s,k}*(f-\Delta f, n) h_{s,k}(f, n)] \qquad \text{[Eqn. 7]}$$

where * represents a complex conjugate, and the frequency correlation $R_{s,k}(\Delta f, n)$ can be regarded as $R_{s,k}(\Delta f)$ because it is not affected by antennas.

Next, a process for transmitting and receiving a sounding signal in a TDD OFDM communication system according to an embodiment of the present invention will be described with reference to FIG. 2.

Figure 2:
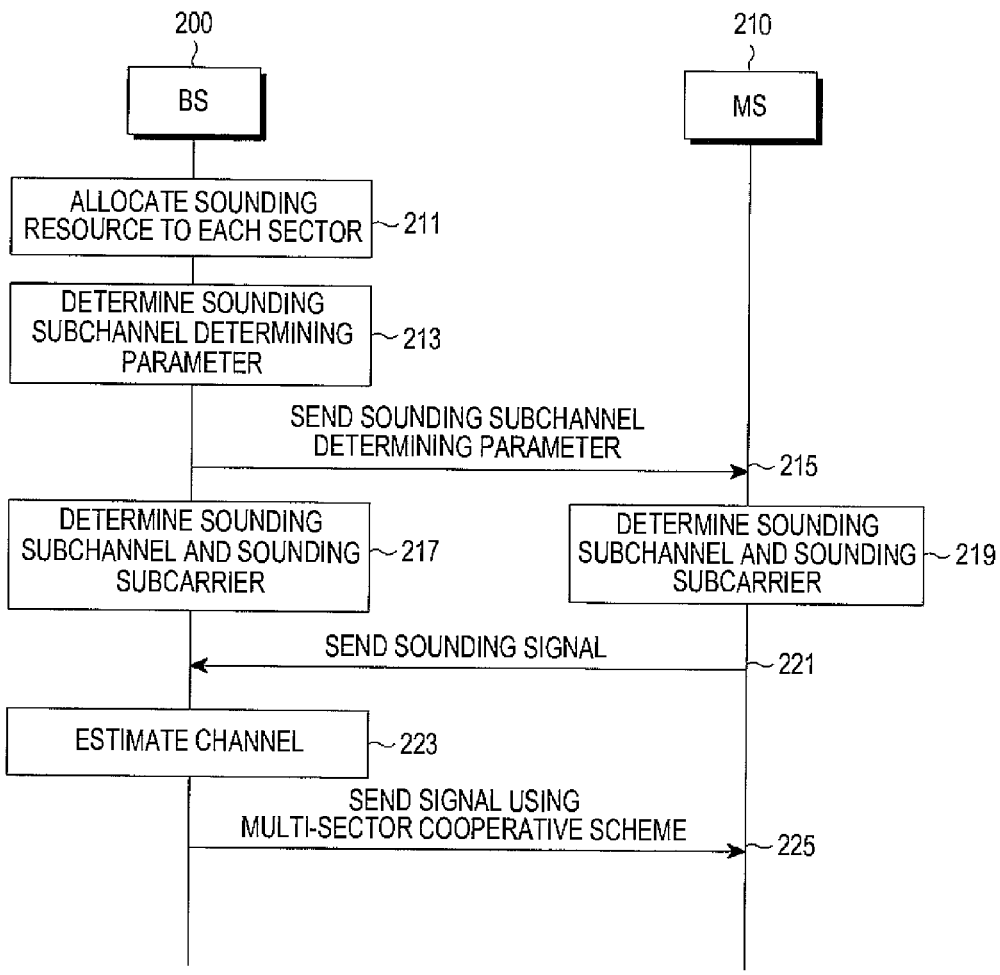
FIG. 2 illustrates a signal flow process for transmitting and receiving a sounding signal in a TDD OFDM communication system according to an embodiment of the present invention.

FIG. 2 illustrates a signal flow process for transmitting and receiving a sounding signal in a TDD OFDM communication system according to an embodiment of the present invention.

Referring to FIG. 2, a BS 200 allocates sounding resources to respective sectors in block 211. It is assumed that the BS 200 uses a sounding resource reuse scheme with a reuse factor S, where S represents the number of sectors included in the BS 200. When using the sounding resource reuse scheme with a reuse factor S, the BS 200 divides all available sounding resources into S sets, and allocates different sounding resources to S sectors.

The BS 200 determines at least one sounding subchannel determining parameter for an MS 210 in block 213, and transmits the determined sounding subchannel determining parameter 215 to the MS 210. The sounding subchannel determining parameter will be described in detail below.

The BS 200 determines at least one sounding subchannel and at least one sounding subcarrier to be used by the MS 210 based on the determined sounding subchannel determining parameter in block 217. The MS 210 also determines at least one sounding subchannel and at least one sounding subcarrier using the sounding subchannel determining parameter received from the BS 200 in block 219. Because the BS 200 and the MS 210 each determine the sounding subchannel and the sounding subcarrier using the sounding subchannel determining parameter, the BS 200 is not required to transmit to the MS 210 information about the sounding subchannel and the sounding subcarrier to be used by the MS 210, which reduces signaling overhead.

The MS 210 transmits a sounding signal 221 to the BS 200 using the determined sounding subchannel and sounding subcarrier. The BS 200 receives the sounding signal transmitted by the MS 210 using the determined sounding subchannel and sounding subcarrier, and estimates a channel using the received sounding signal in block 223. The channel may be estimated using a Minimum Mean Square Error (MMSE) approach. After the channel estimation, the BS 200 transmits a signal 225 using a multi-sector cooperative scheme.

The sounding subchannel determining parameter is described below.

Two types of sounding subchannel determining parameters are proposed by the present invention. A first-type sounding subchannel determining parameter includes an MS index k and a threshold $\delta_k$, and a second-type sounding subchannel determining parameter includes an MS index k and an overhead index $O_k$.

A process for determining a sounding subchannel using a first-type sounding subchannel determining parameter in a TDD OFDM communication system will be described with reference to FIG. 3.

Figure 3:
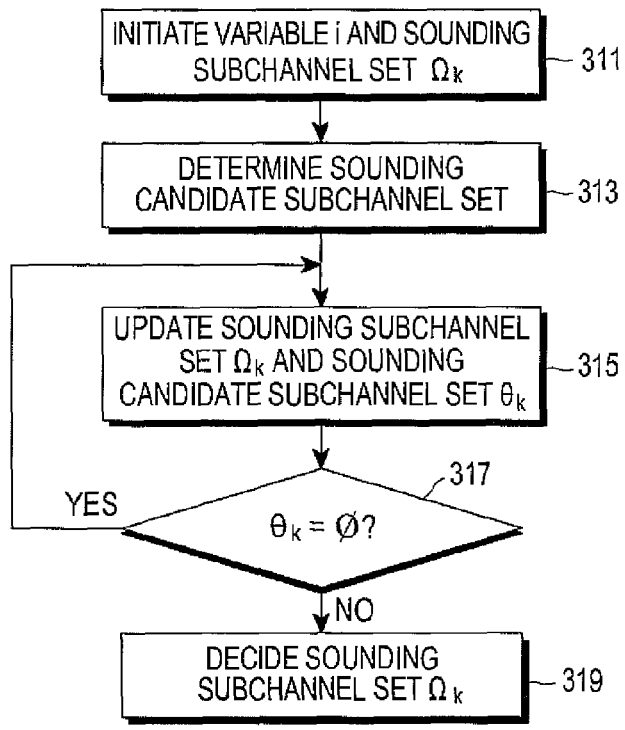
FIG. 3 illustrates a process for determining a sounding subchannel using first-type sounding subchannel determining parameters in a TDD OFDM communication system according to an embodiment of the present invention.

FIG. 3 illustrates a process for determining a sounding subchannel using a first-type sounding subchannel determining parameter in a TDD OFDM communication system according to an embodiment of the present invention.

In FIG. 3, $\Omega_k$ denotes a sounding subchannel set for an MS k and $\Theta_k$ denotes a sounding candidate subchannel set for an MS k. While the sounding subchannel and sounding subcarrier determining process will be described in FIG. 3 on the assumption that a sounding subchannel and a sounding subcarrier are determined by an MS for convenience of description, a BS may also determine a sounding subchannel and a sounding subcarrier using the sounding subchannel and sounding subcarrier determining process described in FIG. 3.

The sounding candidate subchannel set includes sounding subchannels to be used by an MS, and the sounding subchannel set includes sounding subchannels selected by the MS among the sounding subchannels in the sounding candidate subchannel set.

Referring to FIG. 3, an MS initiates a variable i and a sounding subchannel set $\Omega_k$ in block 311. The variable i and the sounding subchannel set $\Omega_k$ are initiated as i=1 and $\Theta_k=\emptyset$, respectively. In block 313, the MS determines a sounding candidate subchannel set in accordance with Equation 8 below.

$$\Theta_k(j) = \lfloor j(4k^2+1)+k, \bmod, M \rfloor \text{ for } 0 \leq j \leq M-1 \quad \text{[Eqn. 8]}$$

where $\Theta_k(j)$ represents a j-th element among elements in a sounding candidate subchannel set $\Theta_k$, and [k, mod, M] represents a remainder of an operation of dividing 'k' by 'M'.

In block 315, the MS updates the sounding subchannel set $\Omega_k$ and the sounding candidate subchannel set $\Theta_k$ using a frequency correlation in accordance with Equation 9 below.

$$\hat{m}_{k,i} = \Theta_k(0)$$

$$\Omega_k \leftarrow \Omega_k \cup \{\hat{m}_{k,i}\}$$

$$\Theta_k = \{m \in \Theta_k | |R_{s,k}((m-\hat{m}_{k,i})F)| < \delta_k\} \quad \text{[Eqn. 9]}$$

where $\delta_k$ represents a frequency correlation threshold for an MS k, m denotes an element of a candidate subchannel set $\Theta_k$, and $\hat{m}_{k,i}$ denotes a sounding subchannel set.

In block 317, the MS determines whether $\Theta_k=\emptyset$, i.e., whether there are no elements in the sounding candidate subchannel set $\Theta_k$. If $\Theta_k=\emptyset$, the MS increases a value of the variable i by a preset value, e.g., 1 (i←i+1) and then returns to block 315.

However, if $\Theta_k \neq \emptyset$, the MS decides (or settles) the sounding subchannel set $\Omega_k$ in block 319 in accordance with Equation 10.

$$\Omega_k = \begin{bmatrix} \hat{m}_{k,1} \\ \vdots \\ \hat{m}_{k,i} \end{bmatrix} \quad \text{[Eqn. 10]}$$

By determining sounding subchannels using the first-type sounding subchannel determining parameter as described in FIG. 3, the following gain may be acquired.

First, because sounding signals are transmitted and received using only the sounding subchannels whose frequency correlation is lower than a threshold $\delta_k$ as represented in Equation 9, the proposed scheme may reduce signaling overhead required for sounding signal transmission/reception, compared with the conventional sounding signal transmission/reception scheme using the entire frequency band.

In addition, because the sounding subchannel set $\Omega_k$, decided as shown in Equation 10, is determined using an MS index, a threshold, and a frequency correlation that are shared by a BS and an MS, the BS is not required to transmit information related to allocation of sounding subchannels to the MS separately.

Also, a different sounding candidate subchannel set $\Theta_k$ is created for every MS, thereby reducing the probability that MSs will transmit sounding signals using the same sounding subchannels, and thus minimizing interference between a sounding signal transmitted by a specific MS and a sounding signal transmitted by another MS.

Next, a process for determining a sounding subchannel using a second-type sounding subchannel determining parameter in a TDD OFDM communication system will be described with reference to FIG. 4.

Figure 4:
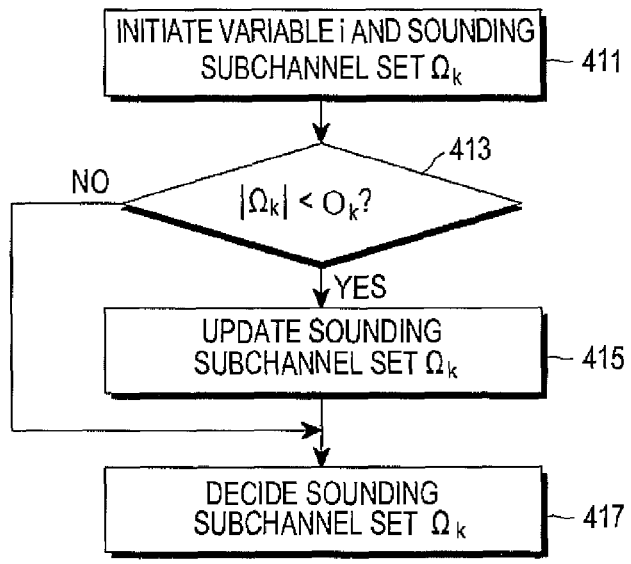
FIG. 4 illustrates a process for determining a sounding subchannel using second-type sounding subchannel determining parameters in a TDD OFDM communication system according to an embodiment of the present invention.

FIG. 4 illustrates a process for determining a sounding subchannel using a second-type sounding subchannel determining parameter in a TDD OFDM communication system according to an embodiment of the present invention.

While the sounding subchannel and sounding subcarrier determining method will be described in FIG. 4 on the assumption that a sounding subchannel and a sounding subcarrier are determined by an MS for convenience of description, a BS may also determine a sounding subchannel and a sounding subcarrier using the sounding subchannel and sounding subcarrier determining method described in FIG. 4.

Referring to FIG. 4, an MS initiates a variable i and a sounding subchannel set $\Omega_k$ in accordance with Equation 11 in block 411.

$$i=1, \hat{m}_{k,1}=\lfloor 4k^2+k+1, \bmod, M \rfloor, \Omega_k=\{\hat{m}_{k,1}\} \quad \text{[Eqn. 11]}$$

In block 413, the MS determines whether $|\Omega_k| < O_k$. If $|\Omega_k| O_k$, the MS increases a value of the variable i by a preset value, e.g., 1 (i←i+1) and then proceeds to block 415. In block 415, the MS updates the sounding subchannel set $\Omega_k$ in accordance with Equation 12 below using a frequency correlation.

$$\hat{m}_{k,i} = \min_{m'_k \notin \Omega_k} \left( \max_{\hat{m}_k \in \Omega_k} |R_{s,k}((m'_k - \hat{m}_k)F)| \right), \quad \text{[Eqn. 12]}$$

$$\Omega_k \leftarrow \Omega_k \cup \{\hat{m}_{k,i}\}$$

where, $m'_k$ denotes an element of $\hat{m}_{k,i}$.

However, if $|\Omega_k|=O_k$ in block 413, the MS decides the sounding subchannel set $\Omega_k$ in accordance with Equation 13 in block 417.

$$\Omega_k = \begin{bmatrix} \hat{m}_{k,1} \\ \vdots \\ \hat{m}_{k,O_k} \end{bmatrix} \quad \text{[Eqn. 13]}$$

By determining sounding subchannels using the second-type sounding subchannel determining parameter as described in FIG. 4, the following gains may be obtained.

First, because sounding signals are transmitted and received using only $O_k$ sounding subchannels with a low frequency correlation as represented in Equation 12, the proposed scheme may reduce signaling overhead required for sounding signal transmission/reception, compared with the conventional sounding signal transmission/reception scheme using the entire frequency band.

In addition, because the sounding subchannel set $\Omega_k$, decided as shown in Equation 13, is determined using an MS index, an overhead index, and a frequency correlation that are shared by a BS and an MS, the BS is not required to transmit information associated with allocation of sounding subchannels to the MS separately.

Also, a different initial sounding subchannel set $\hat{m}_{k,1}$ is created for every MS as described in block 411, thereby reducing the probability that MSs will transmit sounding signals using the same sounding subchannels, and thus minimizing interference between a sounding signal transmitted by a specific MS and a sounding signal transmitted by another MS.

After determining sounding subchannels using the first-type sounding subchannel determining parameter and the second-type sounding subchannel determining parameter (i.e., after deciding the sounding subchannel set $\Omega_k$ using the first-type sounding subchannel determining parameter and the second-type sounding subchannel determining parameter) the MS determines a sounding subcarrier used to actually transmit a sounding signal among sounding subcarriers included in its sounding subchannel in accordance with Equation 14 below.

$$\Lambda_{s,k} = \left\{ \hat{m}_k F + \frac{Fs}{S} + \left[k + Dd, \bmod, \frac{F}{S}\right] \middle| \hat{m}_k \in \Omega_k, \right. \quad \text{[Eqn. 14]}$$
$$\left. 0 \le d \le \left\lfloor \frac{F}{SD} \right\rfloor - 1, \text{ and } 1 \le D \le \frac{F}{S} \right\}$$

where D represents a decimation index, and each MS may increase sounding signal's transmit power up to DS times an average transmit power $P_0$.

Next, a process for estimating channel information using MMSE in a TDD OFDM communication system according to an embodiment of the present invention will be described with reference to FIG. 5.

Figure 5:
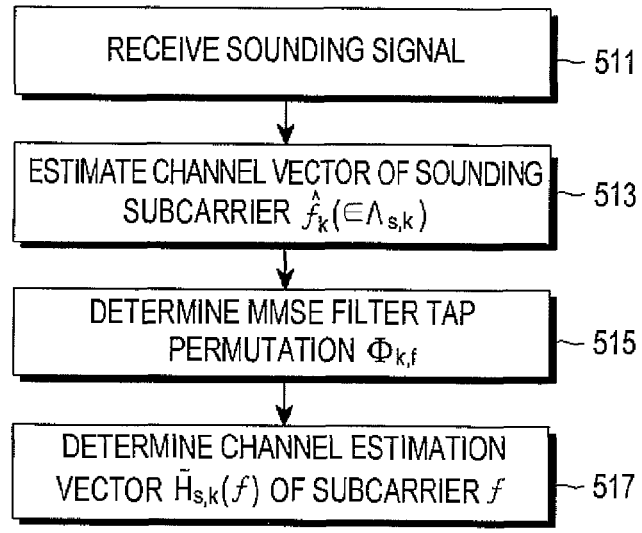
FIG. 5 illustrates a process for estimating channel information using MMSE in a TDD OFDM communication system according to an embodiment of the present invention.

FIG. 5 illustrates a process for estimating channel information using MMSE in a TDD OFDM communication system according to an embodiment of the present invention.

Referring to FIG. 5, a BS receives a sounding signal from an MS in block 511. In block 513, the BS estimates a channel vector of a sounding subcarrier $\hat{f}(\delta \Lambda_{s,k})$ using a channel estimation scheme such as Least Square (LS), in accordance with Equation 15.

$$\tilde{H}_{s,k}(\hat{f}_k) = \frac{1}{DSP_0} Y_s(\hat{f}_k), \text{ for } \hat{f}_k \in \Lambda_{s,k} \quad \text{[Eqn. 15]}$$

In block 515, the BS determines an MMSE filter tap permutation $\Phi_{k,f}$ including $T_k$ subcarriers to estimate a channel vector $H_{s,k}(f)$ of a subcarrier $f(0 \le f \le MF-1)$ for an MS k with a low MSE, and then proceeds to block 517.

A process for determining the MMSE filter tap permutation $\Phi_{k,f}$ will be described with reference to FIG. 6.

Figure 6:
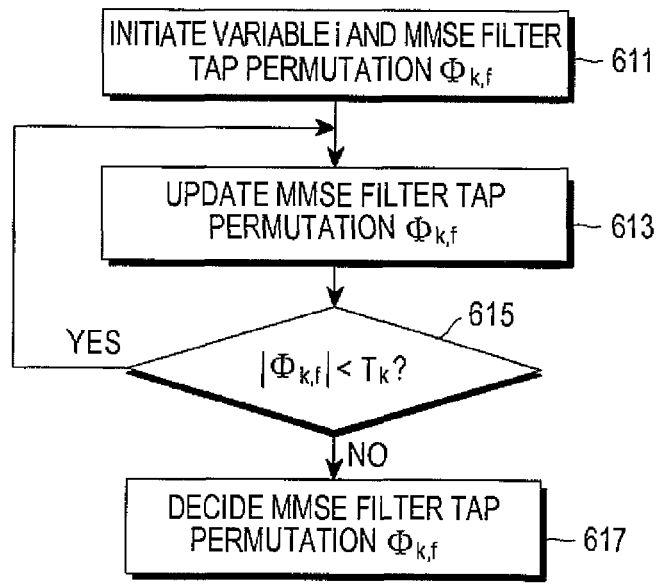
FIG. 6 illustrates a process for determining an MMSE filter tap permutation $\Phi_{k,f}$ in block 515 of FIG. 5.

FIG. 6 illustrates a process for determining the MMSE filter tap permutation $\Phi_{k,f}$ in block 515 of FIG. 5.

Referring to FIG. 6, the BS initiates a variable i and an MMSE filter tap permutation $\Phi_{k,f}$ in block 611 (i=1 and $\Phi_{k,f}=\emptyset$). In block 613, the BS updates the MMSE filter tap permutation $\Phi_{k,f}$ using a frequency correlation in accordance with Equation 16 below.

$$\Phi_{k,f}(i) = \arg\max_{\hat{f}_k \in \Lambda_{s,k} - \Phi_{k,f}} \left| R_{s,k}(f - \hat{f}_k) \right| \quad \text{[Eqn. 16]}$$

where $\Theta_{k,f}(i)$ represents an i-th element in an MMSE filter tap permutation $\Phi_{k,f}$.

In block 615, the BS determines whether $|\Phi_{k,f}|T_k$. If so, the BS returns to block 613 after increasing a value of the variable i by a preset value, e.g., 1 (i←i+1).

However, if $|\Phi_{k,f}| \ge T_k$ in block 615, the BS decides the MMSE filter tap permutation $\Phi_{k,f}$ in accordance with Equation 17 below in block 617.

$$\Phi_{k,f} = \begin{bmatrix} \Phi_{k,f}(1) \\ \vdots \\ \Phi_{k,f}(T_k) \end{bmatrix} \quad \text{[Eqn. 17]}$$

Referring back to FIG. 5, in block 517, the BS determines a channel estimation vector $\tilde{H}_{s,k}(f)$ of a subcarrier f in accordance with Equation 18 using an MMSE channel estimation scheme that uses an MMSE filter tap permutation $\Phi_{k,f}$ and a frequency correlation.

$$\tilde{H}_{s,k}(f) = (C_{s,k}(f, \Phi_{k,f}) R_{s,k}^{-1}(\Phi_{k,f}) \tilde{H}_{s,k}^T(\Phi_{k,f})^T \quad \text{[Eqn. 18]}$$

where T represents a transpose matrix operation, and $C_{s,k}(f, \Phi_{k,f})$ represents a cross correlation vector between a subcarrier f and a filter tap permutation $\Phi_{k,f}$, and can be expressed as Equation 19) below.

$$C_{s,k}(\Phi_{k,f}) = [R_{s,k}(f-\Phi_{k,f}(1)) R_{s,k}(f-\Phi_{k,f}(2)) \ldots R_{s,k}(f-\Phi_{k,f}(T_k))] \quad \text{[Eqn. 19]}$$

Furthermore, $R_{s,k}(\Phi_{k,f})$ in Equation 18 represents an auto correlation matrix of a filter tap permutation $\Phi_{k,f}$, and can be expressed as Equation 20 below.

$$R_{s,k}(\Phi_{k,f}) = \begin{bmatrix} R_{s,k}(\Phi_{k,f}(1)-\Phi_{k,f}(1)) & \ldots & R_{s,k}(\Phi_{k,f}(1)-\Phi_{k,f}(T_k)) \\ \vdots & \ddots & \vdots \\ R_{s,k}(\Phi_{k,f}(T_k)-\Phi_{k,f}(1)) & \ldots & R_{s,k}(\Phi_{k,f}(T_k)-\Phi_{k,f}(T_k)) \end{bmatrix} \quad \text{[Eqn. 20]}$$

In addition, $\tilde{H}_{s,k}(\Phi_{k,f})$ in Equation 18 represents a channel estimation matrix for an MMSE filter tap permutation $\Phi_{k,f}$ and can be expressed as Equation 21 below.

$$\tilde{H}_{s,k}(\Phi_{k,f}) = [\tilde{H}_{s,k}(\Phi_{k,f}(1))\tilde{H}_{s,k}(\Phi_{k,f}(2))\ldots\tilde{H}_{s,k}(\Phi_{k,f}(T_k))] \quad [\text{Eqn. 21}]$$

Meanwhile, the BS can perform multi-sector cooperative transmission using sounding channel information. A process in which a BS performs multi-sector cooperative transmission using sounding channel information is described below.

First, the BS estimates a Signal-to-Interference plus Noise Ratio (SINR) $\tilde{\gamma}_k(f)$ for a subcarrier f used by an MS k in accordance with Equation 22 below using a channel estimation vector $\tilde{H}_k(f)$.

$$\tilde{\gamma}_k(f) = \gamma_0 \|\tilde{H}_k(f)\|^2 \quad [\text{Eqn. 22}]$$

where $\gamma_O$ represents an average SINR, and $\|E\|$ represents a vector norm function of E.

The BS selects an MS $\pi_f (=\arg\max_{k=\{0,\ldots,K-1\}}\{\tilde{\gamma}_k(f)\})$ with the highest SINR in a subcarrier f, generates a beam $w_{\pi_f}(f)$ in accordance with Equation 23, and cooperatively transmits a signal using the generated beam.

$$w_{\pi_f}(f) = \frac{\tilde{H}^*_{\pi_f}(f)}{\|\tilde{H}_{\pi_f}(f)\|} \quad [\text{Eqn. 23}]$$

When a BS performs multi-sector cooperative transmission as described above, its performance may be analyzed as follows.

First, a received signal $r_{\pi_f}(f)$ of an MS $\pi_f$ for a cooperative beam $W_{\pi_f}(f)$ in Equation 23 can be represented by Equation 24 below.

$$r_{\pi_f}(f) = H_{\pi_f}^T(f) w_{\pi_f}(f) X_{\pi_f}(f) + N(f) \quad [\text{Eqn. 24}]$$

where $X_{\pi_f}(f)$ represents a data signal for a subcarrier f used by an MS $\pi_f$, and N(f) represents a Gaussian noise.

In addition, a received SINR $\gamma_{\pi_f}(f)$ for the received signal $r_{\pi_f}(f)$ can be defined as Equation 25 below.

$$\gamma_{\pi_f}(f) = 2\gamma_0 |H_{\pi_f}^T(f) w_{\pi_f}(f)|^2 \quad [\text{Eqn. 25}]$$

$$= 2\gamma_0 \frac{\left|\frac{\alpha_{\pi_f}^2}{\alpha_{\pi_f}^2 + \sigma_{\pi_f}^2}\|\tilde{H}_{\pi_f}(f)\|^2 + \frac{\alpha_{\pi_f}\sigma_{\pi_f}}{\sqrt{\alpha_{\pi_f}^2 + \sigma_{\pi_f}^2}} Z_{\pi_f}^T(f)\tilde{H}^*_{\pi_f}(f)\right|^2}{\|\tilde{H}_{\pi_f}(f)\|^2}$$

For $\alpha_{\pi_f} = \alpha$ and $\alpha_{\pi_f}^2 = \alpha^2$, an expected value $\bar{\gamma}$ of the received SINR can be calculated using Equation 26 below.

$$\bar{\gamma} = E[\gamma_{\pi_f}(f)] \quad [\text{Eqn. 26}]$$

$$= \frac{2\alpha^2 \gamma_0}{\alpha^2 + \sigma^2}\left(\frac{\alpha^2}{\alpha^2 + \sigma^2} E[\|\tilde{H}_{\pi_f}(f)\|^2] + \sigma^2\right)$$

$$\leq \frac{2\alpha^2 \gamma_0}{\alpha^2 + \sigma^2}\left(2\alpha^2 N \sum_{k=1}^{K}\frac{1}{K} + \sigma^2\right)$$

The expected value $\bar{\gamma}$ of the received SINR increases with an increase in the number K of MSs or a decrease in a sounding channel estimation MSE $\sigma^2$.

By transmitting and receiving sounding signals as proposed by the present disclosure, full-band channel information may be provided to a plurality of MSs with a low MSE, making it possible to maximize multi-sector cooperative transmission performance.

An internal structure of a BS in a TDD OFDM communication system according to an embodiment of the present invention will now be described with reference to FIG. 7.

Figure 7:
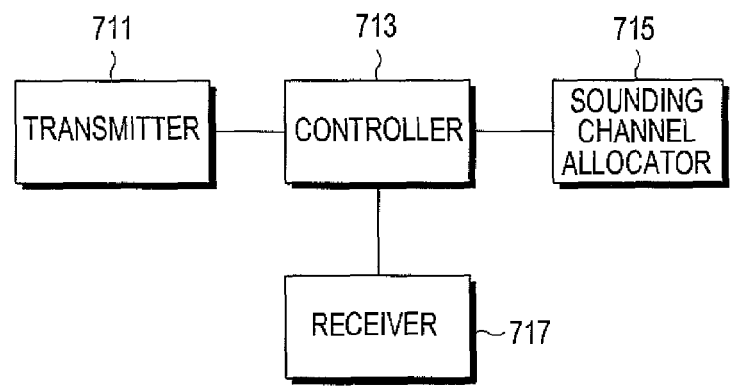
FIG. 7 illustrates an internal structure of a BS in a TDD OFDM communication system according to an embodiment of the present invention.

FIG. 7 illustrates an internal structure of a BS in a TDD OFDM communication system according to an embodiment of the present invention.

Referring to FIG. 7, the BS includes a transmitter 711, a controller 713, a sounding channel allocator 715, and a receiver 717.

The controller 713 controls the overall operation of the BS and determines a sounding subchannel and a sounding subcarrier for a specific MS using a first-type sounding subchannel determining parameter or a second-type sounding subchannel determining parameter. The controller 713 controls the sounding channel allocator 715 to allocate a sounding channel so as to correspond to the determined sounding subchannel and sounding subcarrier. The sounding channel allocator 715 allocates a sounding channel for the MS under control of the controller 713.

The transmitter 711 transmits the first-type sounding subchannel determining parameter or the second-type sounding subchannel determining parameter to the MS under control of the controller 713. The receiver 717 receives a sounding signal from the MS using a sounding channel allocated by the sounding channel allocator 715. The controller 713 estimates a channel using the sounding signal. The operation of the controller 713 has been described in FIGS. 2 to 6.

Next, an internal structure of an MS in a TDD OFDM communication system according to an embodiment of the present invention will be described with reference to FIG. 8.

Figure 8:
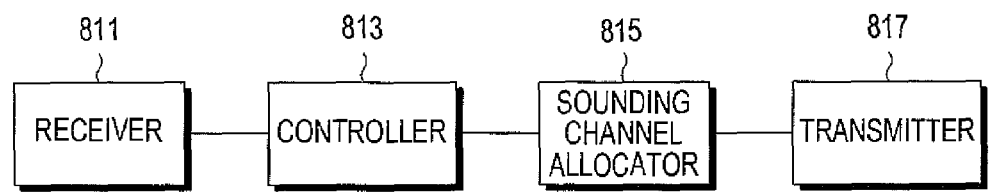
FIG. 8 illustrates an internal structure of an MS in a TDD OFDM communication system according to an embodiment of the present invention.

FIG. 8 illustrates an internal structure of an MS in a TDD OFDM communication system according to an embodiment of the present invention.

Referring to FIG. 8, the MS includes a receiver 811, a controller 813, a sounding channel allocator 815, and a transmitter 817.

The controller 813 controls the overall operation of the MS, and determines a sounding subchannel and a sounding subcarrier to be used by its MS using a first-type sounding subchannel determining parameter or a second-type sounding subchannel determining parameter. The controller 813 controls the sounding channel allocator 815 to allocate a sounding channel so as to correspond to the determined sounding subchannel and sounding subcarrier. The sounding channel allocator 815 allocates a sounding channel to be used by its MS under control of the controller 813.

The receiver 811 receives the first-type sounding subchannel determining parameter or the second-type sounding subchannel determining parameter from the BS. The transmitter 817 transmits a sounding signal to the BS using the sounding channel allocated by the sounding channel allocator 815. The operation of the controller 813 has been described in FIGS. 2 and 3.

As is apparent from the foregoing description, according to an embodiment of the present invention, sounding signals can be transmitted and received using channel information of MSs in a wireless communication system, thereby minimizing ISI while minimizing sounding resources used for transmission/reception of sounding signals. In addition, sounding subchannels and sounding subcarriers may be determined by an MS and a BS independently in a wireless communication system, thereby reducing signaling overhead required for transmission/reception of sounding subchannels and sounding subcarriers.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving a reference signal by a receiving apparatus in a communication system, the method comprising:
   transmitting at least one parameter to a transmitting apparatus, the at least one parameter comprising a transmitting apparatus index for identifying a transmitting apparatus of a plurality of transmitting apparatuses, wherein the transmitting apparatus index designates a subchannel set solely for the transmitting apparatus; and
   receiving a reference signal from the transmitting apparatus over a subchannel of the subchannel set designated solely for the transmitting apparatus,
   wherein the at least one parameter is determined for allocating a subchannel based on a frequency correlation.

2. The method of claim 1, wherein the at least one parameter further comprises a threshold.

3. The method of claim 1, wherein the subchannel is allocated based on a subchannel set including subchannels to be used by the transmitting apparatus and a candidate subchannel set including subchannels selected by the transmitting apparatus among subchannels included in the subchannel set.

4. The method of claim 1, wherein the at least one parameter further comprises an overhead index.

5. The method of claim 1, further comprising:
   estimating a channel based on the reference signal received from the transmitting apparatus; and
   transmitting a signal based on a multi-sector cooperative scheme to the transmitting apparatus.

6. The method of claim 1, wherein the subchannel is allocated based on the at least one parameter.

7. A method for transmitting a reference signal by a transmitting apparatus in a communication system, the method comprising:
   receiving at least one parameter from a receiving apparatus, the at least one parameter comprising a transmitting apparatus index for identifying a transmitting apparatus of a plurality of transmitting apparatuses, wherein the transmitting apparatus index designates a subchannel set solely for the transmitting apparatus; and
   transmitting a reference signal to the receiving apparatus over a subchannel of the subchannel set designated solely for the transmitting apparatus,
   wherein the at least one parameter is determined for allocating a subchannel based on a frequency correlation.

8. The method of claim 7, wherein the at least one parameter further comprises a threshold.

9. The method of claim 7, wherein the subchannel is allocated based on a subchannel set including subchannels to be used by the transmitting apparatus and a candidate subchannel set including subchannels selected by the transmitting apparatus among subchannels included in the subchannel set.

10. The method of claim 7, wherein the at least one parameter further comprises an overhead index.

11. The method of claim 7, wherein transmitting the reference signal comprises selecting a subcarrier from among a set of subcarriers associated with the allocated subchannel.

12. The method of claim 7, wherein the subchannel is allocated based on the at least one parameter.

13. A receiving apparatus in a communication system, the receiving apparatus comprising:
   a transmitter configured to transmit at least one parameter to a transmitting apparatus, the at least one parameter comprising a transmitting apparatus index for identifying a transmitting apparatus of a plurality of transmitting apparatuses, wherein the transmitting apparatus index designates a subchannel set solely for the transmitting apparatus; and
   a receiver configured to receive a reference signal from the transmitting apparatus over a subchannel of the subchannel set designated solely for the transmitting apparatus,
   wherein the at least one parameter is determined for allocating a subchannel based on a frequency correlation.

14. The receiving apparatus of claim 13, wherein the at least one parameter further comprises a threshold.

15. The receiving apparatus of claim 13, wherein the subchannel is allocated based on a subchannel set including subchannels to be used by the transmitting apparatus, and a subchannel set including subchannels selected by the transmitting apparatus among subchannels included in the subchannel set.

16. The receiving apparatus of claim 13, wherein the at least one parameter further comprises an overhead index.

17. The receiving apparatus of claim 13, further comprising:
   a controller configured to estimate a channel based on the reference signal received from the transmitting apparatus,
   wherein the transmitter is further configured to transmit a signal based on a multi-sector cooperative scheme to the transmitting apparatus.

18. The receiving apparatus of claim 13, wherein the subchannel is allocated based on the at least one parameter.

19. A transmitting apparatus in a communication system, the transmitting apparatus comprising:
   a receiver configured to receive at least one parameter from a receiving apparatus, the at least one parameter comprising a transmitting apparatus index for identifying a transmitting apparatus of a plurality of transmitting apparatuses, wherein the transmitting apparatus index designates a subchannel set solely for the transmitting apparatus; and
   a transmitter configured to transmit a reference signal to the receiving apparatus over a subchannel of the subchannel set designated solely for the transmitting apparatus,
   wherein the at least one parameter is determined for allocating a subchannel based on a frequency correlation.

20. The transmitting apparatus of claim 19, wherein the at least one parameter further comprises a threshold.

21. The transmitting apparatus of claim 19, wherein the subchannel is allocated based on a subchannel set including subchannels to be used by the transmitting apparatus, and a candidate subchannel set including subchannels selected by the transmitting apparatus among subchannels included in the subchannel set.

22. The transmitting apparatus of claim 19, wherein the at least one parameter further comprises an overhead index.

23. The transmitting apparatus of claim 19, further comprising:
   a controller configured to select a subcarrier from among a set of subcarriers associated with the allocated subchannel.

24. The transmitting apparatus of claim 19, wherein the subchannel is allocated based on the at least one parameter.

* * * * *